US008639943B2

(12) United States Patent
Bridges et al.

(10) Patent No.: US 8,639,943 B2
(45) Date of Patent: Jan. 28, 2014

(54) METHODS AND SYSTEMS FOR CHECKING RUN-TIME INTEGRITY OF SECURE CODE CROSS-REFERENCE TO RELATED APPLICATIONS

(75) Inventors: Jeffrey Todd Bridges, San Diego, CA (US); Thomas Andrew Sartorius, San Diego, CA (US); Steven M. Millendorf, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 766 days.

(21) Appl. No.: 12/485,089

(22) Filed: Jun. 16, 2009

(65) Prior Publication Data
US 2009/0313695 A1 Dec. 17, 2009

Related U.S. Application Data

(60) Provisional application No. 61/061,738, filed on Jun. 16, 2008.

(51) Int. Cl.
*G06F 11/30* (2006.01)
*G06F 12/14* (2006.01)
(52) U.S. Cl.
USPC .............................. 713/189; 713/187; 713/193
(58) Field of Classification Search
USPC ........................................ 713/187, 189, 193
See application file for complete search history.

(56) References Cited

U.S. PATENT DOCUMENTS

| 5,757,919 A | 5/1998 | Herbert et al. | |
|---|---|---|---|
| 2011/0167278 A1* | 7/2011 | Goto et al. | 713/193 |

FOREIGN PATENT DOCUMENTS

| CN | 1722046 A | 1/2006 |
|---|---|---|
| WO | WO9705551 A1 | 2/1997 |
| WO | WO0010283 A1 | 2/2000 |
| WO | WO0110076 A2 | 2/2001 |
| WO | WO0175595 A2 | 10/2001 |

OTHER PUBLICATIONS

International Search Report and Written Opinion—PCT/US2009/050556—ISA/EPO—May 31, 2011.

* cited by examiner

*Primary Examiner* — Krista Zele
*Assistant Examiner* — Matthew Lindsey
(74) *Attorney, Agent, or Firm* — Peter Michael Kamarchik; Nicholas J. Pauley; Joseph Agusta

(57) ABSTRACT

Methods and systems to guard against attacks designed to replace authenticated, secure code with non-authentic, unsecure code and using existing hardware resources in the CPU's memory management unit (MMU) are disclosed. In certain embodiments, permission entries indicating that pages in memory have been previously authenticated as secure are maintained in a translation lookaside buffer (TLB) and checked upon encountering an instruction residing at an external page. A TLB permission entry indicating permission is invalid causes on-demand authentication of the accessed page. Upon authentication, the permission entry in the TLB is updated to reflect that the page has been authenticated. As another example, in certain embodiments, a page of recently authenticated pages is maintained and checked upon encountering an instruction residing at an external page.

22 Claims, 11 Drawing Sheets

METHODS AND SYSTEMS FOR CHECKING RUN-TIME INTEGRITY OF SECURE CODE CROSS-REFERENCE TO RELATED APPLICATIONS

CROSS-REFERENCE TO RELATED APPLICATIONS

This application claims the benefit of U.S. Provisional Application No. 61/061,738 filed on Jun. 16, 2008, which is incorporated herein by reference.

FIELD OF DISCLOSURE

The field of this disclosure relates to authentication of secure code in a processor-based computing system and more particularly to methods and systems for using memory management unit (MMU) permission hardware to effect run-time integrity checking of secure code.

BACKGROUND

In an embedded microprocessor-based system, for example, in a mobile phone, the system hardware may provide a mechanism for running programs on the microprocessor in one of two modes: secure and non-secure. Programs that run in secure mode are granted permission to access sensitive hardware resources, such as key registers for digital rights management, and register for control of radio hardware; programs running in non-secure mode are denied access to those resources.

Typically secure code is produced and distributed by the manufacturer of the device and is provided with a digital signature that guarantees that the block of provided code has been generated by a trusted authority and can be safely executed with the usual permissions granted to secure code. However, if the secure code resides in off-chip memory external to the processor integrated circuit, attackers may seek to replace such off-chip, secure, authenticated code with nonsecure unauthenticated code. Known approaches to preventing such attacks include periodically re-authenticating any secure code that is stored in off-chip memory, or paging secure code into on-chip memory, much the way a demand-paged system swaps pages from disk to main memory, and authenticating a page each time it is brought on chip.

Because digital signatures are generally relatively short compared to the data being authenticated, authenticating a section of supposedly secure code may take a non-trivial amount of time given an authentication granule of at least dozens and perhaps thousands of bytes. If such code is periodically authenticated, there may be long intervals in which no execution of the secure code is attempted, and so any periodic authentication during that interval would consume time and energy. In addition, paging secure code into on-chip memory may load and authenticate more code than is necessary if the program only needs a few lines from each page, thus consuming on-chip space and power required to load and authenticate most of the code.

Therefore systems and methods are needed to authenticate program code that resides in off-chip memory and to guard against attackers that might try to substitute unauthorized code for the code distributed by the manufacturer or other authorized source.

SUMMARY OF THE DISCLOSURE

Methods and systems that can guard against attacks designed to replace authenticated, secure code with non-authentic, unsecure code and using existing hardware resources in a processor's memory management unit (MMU) are disclosed. Certain embodiments comprise a system with a processor that may run either secure or non-secure instruction code stored in memory. When the processor accesses an instruction from an individual memory page with secure instruction code, logic is implemented to authenticate that page as being an authentic source of secure code. The system also has a memory management unit ("MMU") that maintains a cache of attributes of the memory pages, including execute permissions for the instructions stored in the memory pages. When a memory page is authenticated, the MMU can set execute permissions for the instructions on that page to allow execution of those instructions.

This illustrative embodiment is mentioned not to limit or define the inventive concepts disclosed herein, but to provide examples to aid understanding thereof. Other aspects, advantages, and features of the present disclosure will become apparent after review of the entire application, including the following sections: Brief Description of the Drawings, Detailed Description, and the Claims.

BRIEF DESCRIPTION OF DRAWINGS

These and other features, aspects, and advantages of the present disclosure are better understood when the following Detailed Description is read with reference to the accompanying drawings, wherein.

DETAILED DESCRIPTION

Figure 1:
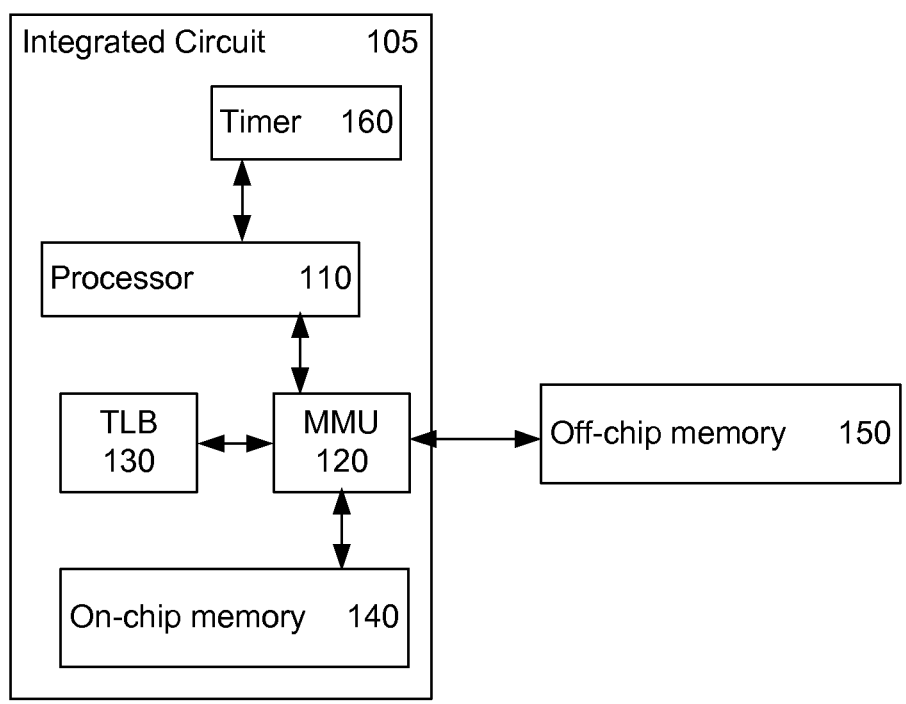
FIG. 1 is a graphical illustration of a portion of an exemplary system.

Detailed embodiments are disclosed herein. However, it is to be understood that the disclosed embodiments are merely exemplary and that different embodiments are possible. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present disclosure.

To prevent non-secure code from executing in secure mode, a system can be configured to enter secure mode only at system reset, or upon execution of a special system instruction, which can be executed in non-secure mode. In either case, the mode is changed to secure and program execution flow is transferred to a fixed memory address, known to contain secure code. Commonly in existing systems, the memory is implemented in either an on-chip read only memory ("ROM") (e.g. for boot) or an on-chip random access memory ("RAM") that has been previously initialized with and by a secure program. The secure program code contained in the on-chip memory is much less vulnerable to malicious tampering than it would be in an off-chip memory, because the interconnection between the on-chip program storage and the processor is not exposed outside the encapsulated integrated circuit package.

After a power-on reset, the system begins executing in secure mode. It generally executes code from an on-chip bootstrap ROM which is known to be secure because it was programmed by the manufacturer and commonly cannot be changed after manufacture. Part of the program code in the boot ROM is a secure code loader that can load code from off-chip memory into on-chip memory and authenticate it using standard digital signing techniques.

Once the secure code is on chip, and the chip is configured to treat it as secure code, that code is reasonably secure from attempts to substitute unauthorized code for the secure code. However, when the amount of secure program code that may be required for such a system exceeds the capacity of the on-chip memory, some secure code must necessarily reside in off-chip memory. Such code can be authenticated as usual, but could then be changed or replaced by an attacker who interposes between the processor and the off-chip memory after the authentication is done.

An exemplary embodiment authenticates pages of off-chip program memory periodically, but does so more efficiently than a "blind" algorithm, by using existing MMU hardware in combination with software to request authentication of pages only if they are in use and have not been authenticated (arbitrarily) recently. This "on-demand" authentication makes sure that all code that is to be executed is authenticated arbitrarily frequently, but code that is not to be executed is not needlessly authenticated.

Note that commonly in existing systems, a translation lookaside buffer ("TLB"), which is a cache of memory attributes, stores the "execute" permission for each entry in the TLB. Entries that are marked to disallow execution are used to resolve the physical address and permission for data-side memory accesses, but attempts by the processor to fetch and execute instructions from a page without execute permission will cause an exception and interrupt. The page table entry (stored in secure memory, for secure pages) for each page will normally indicate whether the page has execute permission, and whether it is secure or non-secure.

Tracking the authentication history of external pages is accomplished in certain embodiments by keeping a list of secure, off-chip pages that have been "recently" authenticated. The list is kept in on-chip memory, to protect it from external tampering. The list uses relatively little memory, as it is just a memory pointer to each authenticated page and perhaps a list size. Before authentication of the external secure pages takes place, the list is initially empty, and initially there are no valid TLB entries granting execute permission to these pages.

FIG. 1 illustrates an exemplary authentication system 100 comprising an integrated circuit chip 105 which has a processor 110 and a memory management unit 120 for managing TLB 130 and on-chip memory 140. Authentication system 100 also comprises a timer 160 and off-chip memory 150 where, as discussed above, secure code may possibly be stored. On-chip memory 140 and off-chip memory 160 represent one or more computer-readable media accessible by processor 110. In certain embodiments timer 160 is on-chip, but need not be in all embodiments.

Embodiments of the authentication system described herein may be disposed in various devices, such as, for example a portable communication device, a cellular telephone, a wireless Internet Protocol telephone, a portable digital assistant, and an audio file player, or other electronic system.

Figure 2:
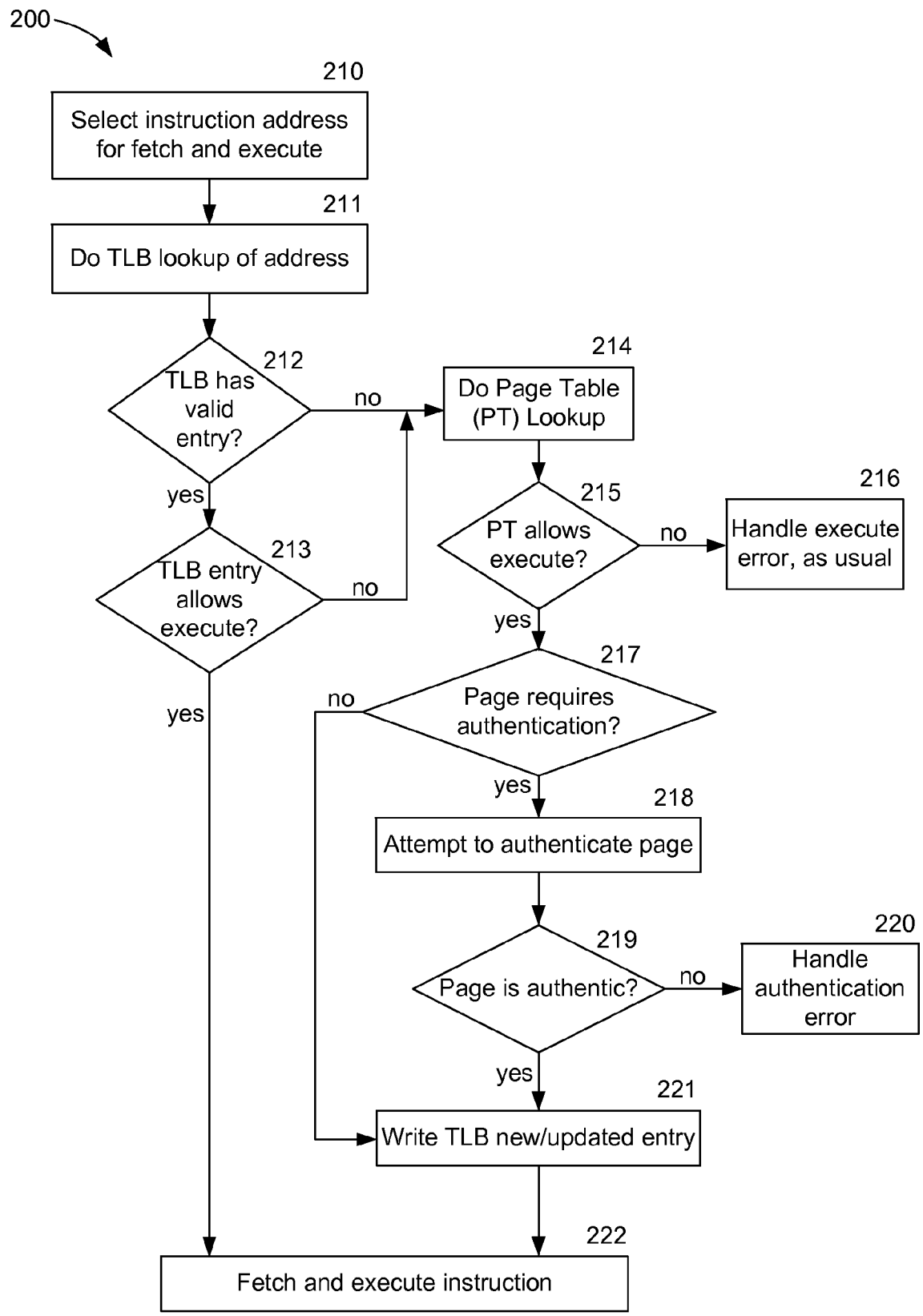
FIG. 2 is a flowchart illustrating a method according to certain embodiments.

A method according to certain embodiments is illustrated more fully in the flowchart 200 on FIG. 2. At block 210, an instruction code address for fetch and execute is selected by processor 110. At block 211 MMU 120 looks up this address in TLB 130 and checks at block 212 to see if there is a valid entry for the page in TLB 130. If there is a valid entry, MMU 120 checks TLB 130 at block 213 to see if execution is permitted. If execution is permitted, execution flow proceeds to the page at block 222.

If execution is not permitted, processor 110 takes an interrupt in the form of an interrupt service routine ("ISR") and implements a page table lookup at block 214, using either a hardware table walk machine or a software table walk routine. Execution is not permitted because TLB 130 will either have no valid entry for the page, or it will have a valid entry with no execute permission. In the case that the page has no valid TLB entry, the ISR attempts to establish one. First the ISR checks the execute permission in the page table at block 214. Note that the secure page table contains execute permissions for various memory pages and either resides in on-chip memory 140 or is authenticated in a similar way. If execution is not permitted, then normal error handling procedures are invoked at block 216. If execution is permitted by the page table, then the ISR ascertains whether the page requires authentication at block 217. The logic for making this determination can be as simple as making all code pages require authentication, but can also include an assessment of whether the page is secure and mapped into off-chip memory 150. The page table entry can have a bit that tells whether the page is secure or not, and the physical location can be deduced from knowledge of the physical address and the system memory map.

If the page does not require authentication, the ISR causes MMU 120 to place a new entry in TLB 130 or updates the existing entry (as appropriate) at block 221 and then execution flow proceeds to the page at block 222. If the page does require authentication, then the ISR attempts to authenticate the page using standard digital techniques at block 218. The ISR then makes a decision at block 219 as to whether the page is authentic. If not, then normal error handling procedures are invoked at block 220. If the page is authentic, then the ISR causes MMU 120 to place a new entry in TLB 130 or updates the existing entry (as appropriate) at block 221 and then execution flow proceeds to the page at block 222.

Figure 3:
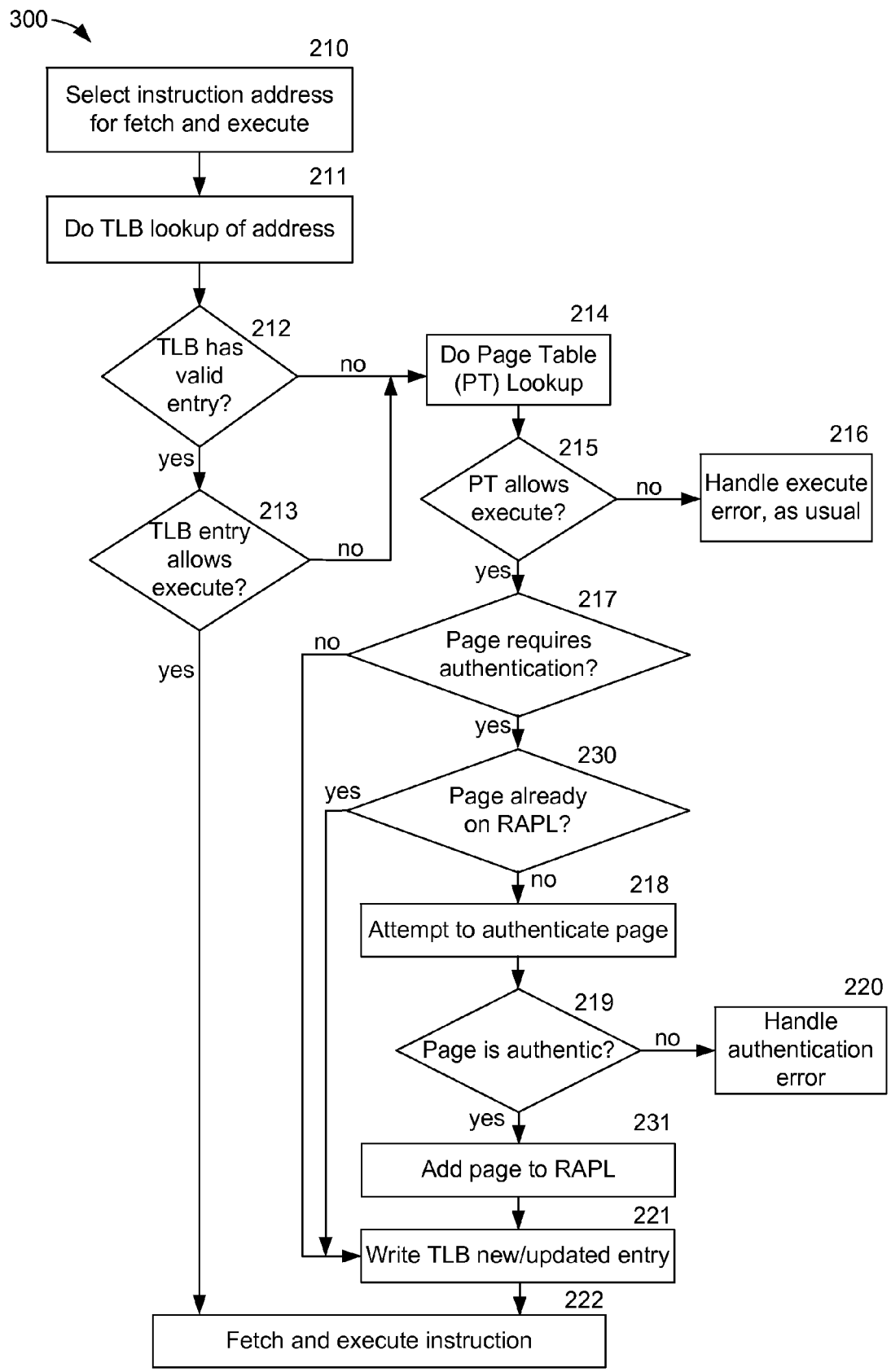
FIG. 3 is a flowchart illustrating a method according to certain embodiments.

FIG. 3 shows a flowchart illustrating an alternative embodiment, where the blocks with numbers corresponding to the block numbers of FIG. 2 play the same roles as discussed above. In this embodiment, if the page requires authentication at block 217, the ISR then checks a recently authenticated pages list ("RAPL") residing in on-chip memory 140 at block 230 to see if the page in question is known to be authentic. If the page is already on the RAPL, then it is not re-authenticated and the ISR causes MMU 120 to establish or update an entry with execute permission in TLB 130 at block 221. Execution flow then proceeds to the page at block 222. If the page is not on the RAPL, then the ISR attempts to authenticate the page using standard digital signature techniques, with or without special hardware (not shown), at block 218 as discussed above. If the page cannot be authenticated, then normal error handling techniques are invoked at block 220. If the page can be authenticated, then at block 231 the ISR writes the page address onto the RAPL resident in on-chip memory 140 and establishes or updates the entry in TLB 130 with execute permission granted at block 221, after which execution flow proceeds to the page at block 222. Note that the ISR taken by processor 110 in certain embodiments is also secure, and so is most conveniently held in on-chip memory 140 after it has been authenticated earlier, at system initialization. Execution proceeds, and the ISR causes MMU 120 to authenticate each secure page in off-chip memory 150 and to note it on the RAPL, as soon as the first attempt is made to execute an instruction from that page. It should be noted that memory management software updates or invalidates the RAPL, as well as TLB 130, if the memory map changes.

Figure 4:
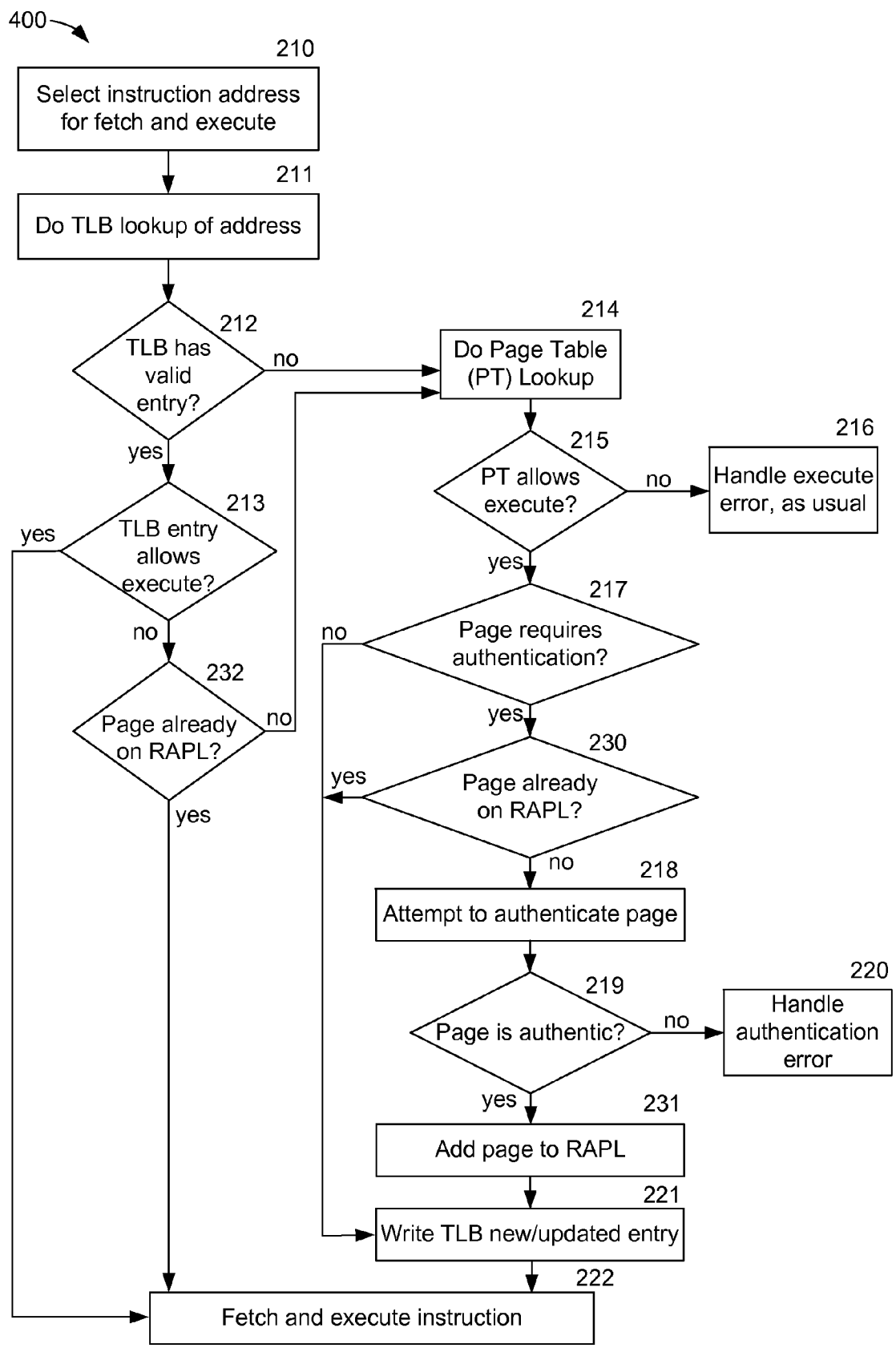
FIG. 4 is a flowchart illustrating a method according to certain embodiments.

FIG. 4 shows flowchart 400 illustrating an alternative embodiment, where the blocks with numbers corresponding to the block numbers of FIGS. 2 and 3 play the same roles as discussed above. In this variant embodiment if the entry in TLB 130 does not permit execution of the instruction at block 213, the ISR checks the RAPL at block 232. If the page is already on the RAPL, then execution flow proceeds to the page at block 221. If the page is not on the RAPL, then the method proceeds to the page table lookup at block 214 and proceeds thereafter according to the discussion of flowchart 300 on FIG. 3 as discussed above.

One of ordinary skill in the art would recognize that the order of execution of the blocks described in flowcharts 200, 300, and 400 above may be implemented in a variety of ways. The order of the blocks presented in the examples above can be varied—for example, blocks can be re-ordered, combined, and/or broken into sub-blocks. Certain blocks or processes can be performed in parallel.

Figure 5:
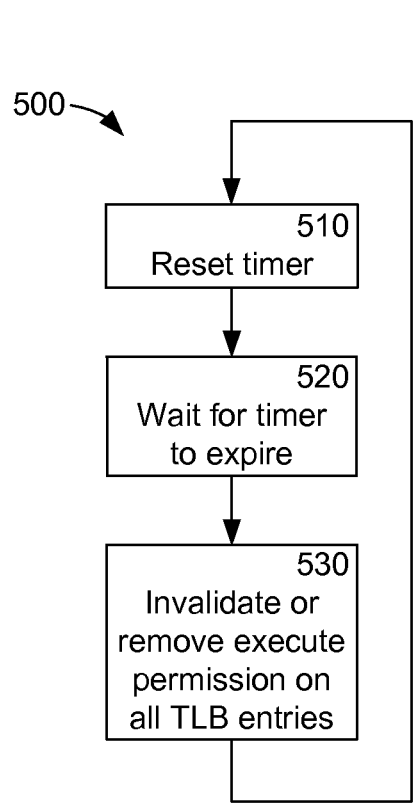
FIG. 5 is a flowchart illustrating a method according to certain embodiments.

As shown in flowchart 500 on FIG. 5, in certain embodiments, processor 110 sets timer 160 as shown at block 510. Upon expiration of timer 160 at block 520, the (secure) ISR taken by processor 110 that responds to a resulting interrupt causes MMU 120 to invalidate the list of authenticated pages residing in off-chip memory 150 by invalidating or removing the execution permission of all entries in TLB 130 at block 530. The length of the time period can be arbitrarily short or long, but in certain embodiments is on the order of a few tenths of seconds to a few seconds, to strike a balance between the time it might take to mount a physical attack on system memory and the desire to minimize the overhead of maintaining the list of authenticated code pages.

Figure 6:
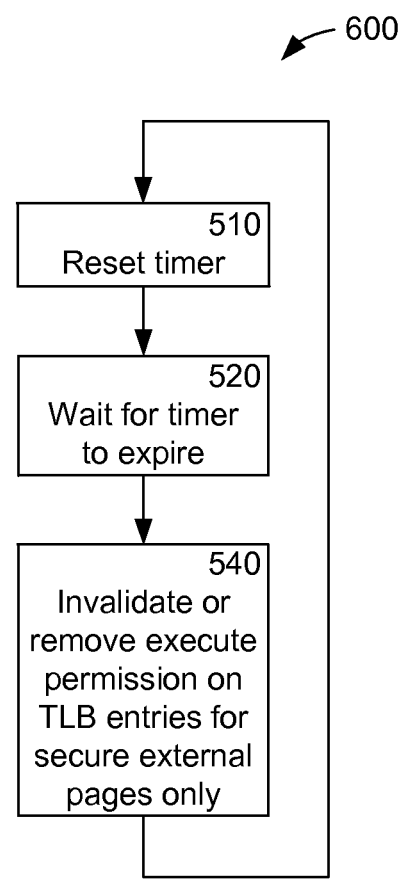
FIG. 6 is a flowchart illustrating a method according to certain embodiments.

Flowchart 600 on FIG. 6 illustrates a variant embodiment, where the blocks with numbers corresponding to the block numbers of FIG. 5 play the same roles as discussed above. In this embodiment, the ISR causes MMU 120 to invalidate or remove execution permission of entries in TLB 130 only for pages residing in off-chip memory 150.

Figures 7, 8:
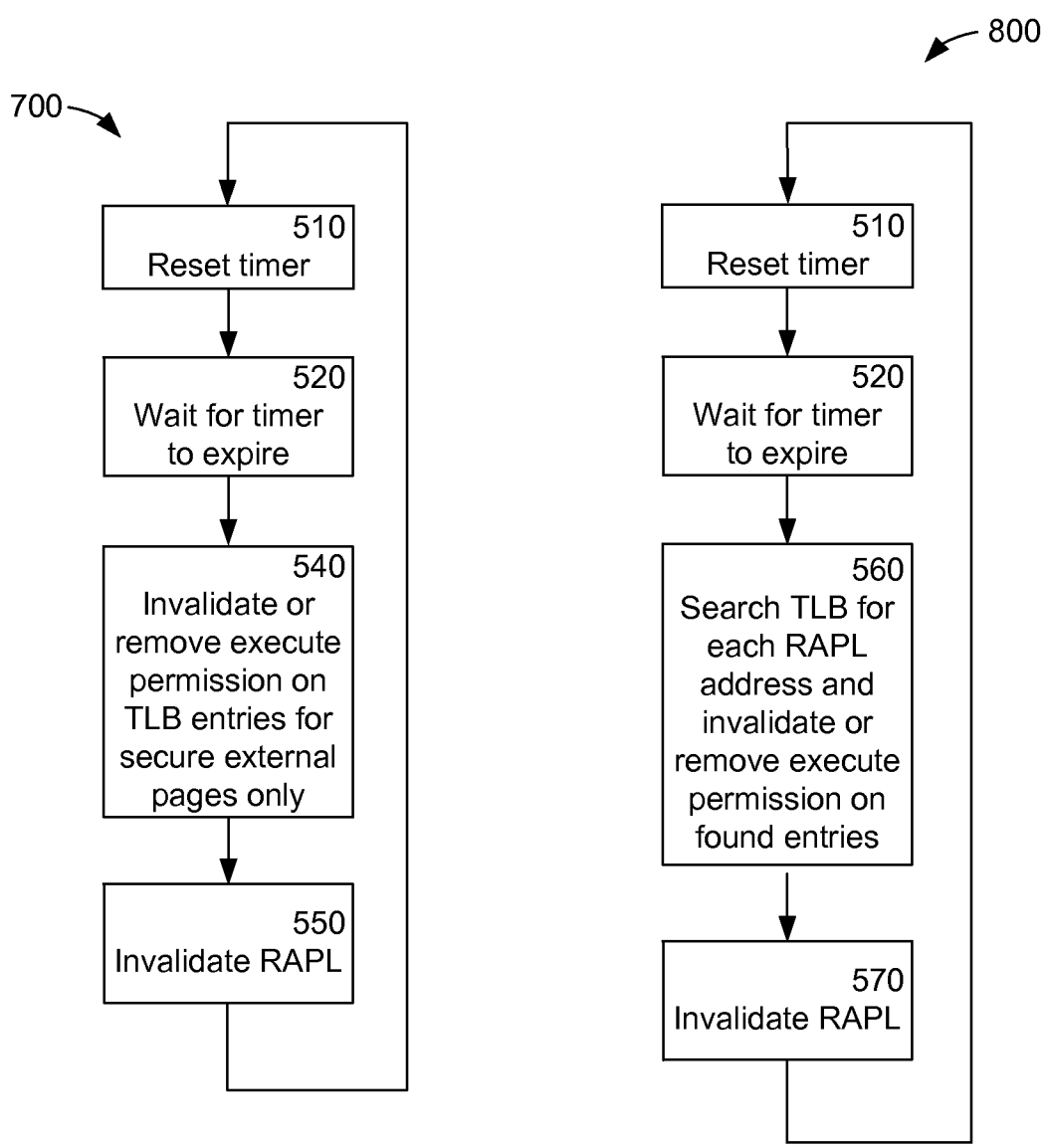
FIG. 7 is a flowchart illustrating a method according to certain embodiments.
FIG. 8 is a flowchart illustrating a method according to certain embodiments.

Flowchart 700 on FIG. 7 illustrates yet another variant embodiment, where the blocks with numbers corresponding to the block numbers of FIGS. 5 and 6 play the same roles as discussed above. In this embodiment, the ISR causes MMU 120 to invalidate the RAPL at block 550 following invalidation or removal of execution permission of the entries in TLB 130 for pages residing in off-chip memory 150 at block 540.

Flowchart 800 on FIG. 8 illustrates another embodiment, where the blocks with numbers corresponding to the block numbers of FIG. 5 play the same roles as discussed above. In this embodiment at block 560 the ISR causes MMU 120 to traverse the RAPL and search for each page's entry in TLB 130, and if found, either invalidate it or (in certain embodiments) reset the entry to remain valid but to have no execute permission at block 560. The ISR then invalidates the RAPL at block 570.

As an additional and optional security measure, a secure kernel operated by processor 110 may be programmed to invalidate the list of authentic pages residing in off-chip memory 150 when a call to secure code residing in off-chip memory 150 is complete and control is about to be returned to non-secure code. That is, once a secure task using secure off-chip memory 150 is complete, the secure code can invalidate the authentication status of off-chip memory 150 without waiting for timer 160 to expire, to shorten the period of vulnerability to attack on the secure memory off-chip memory 150.

The methods described herein may be variously implemented in program code comprising hardware, software, or some combination of the two, as is well-known to one of ordinary skill in the art.

Example Devices Including the Above-Described Features

Figure 9:
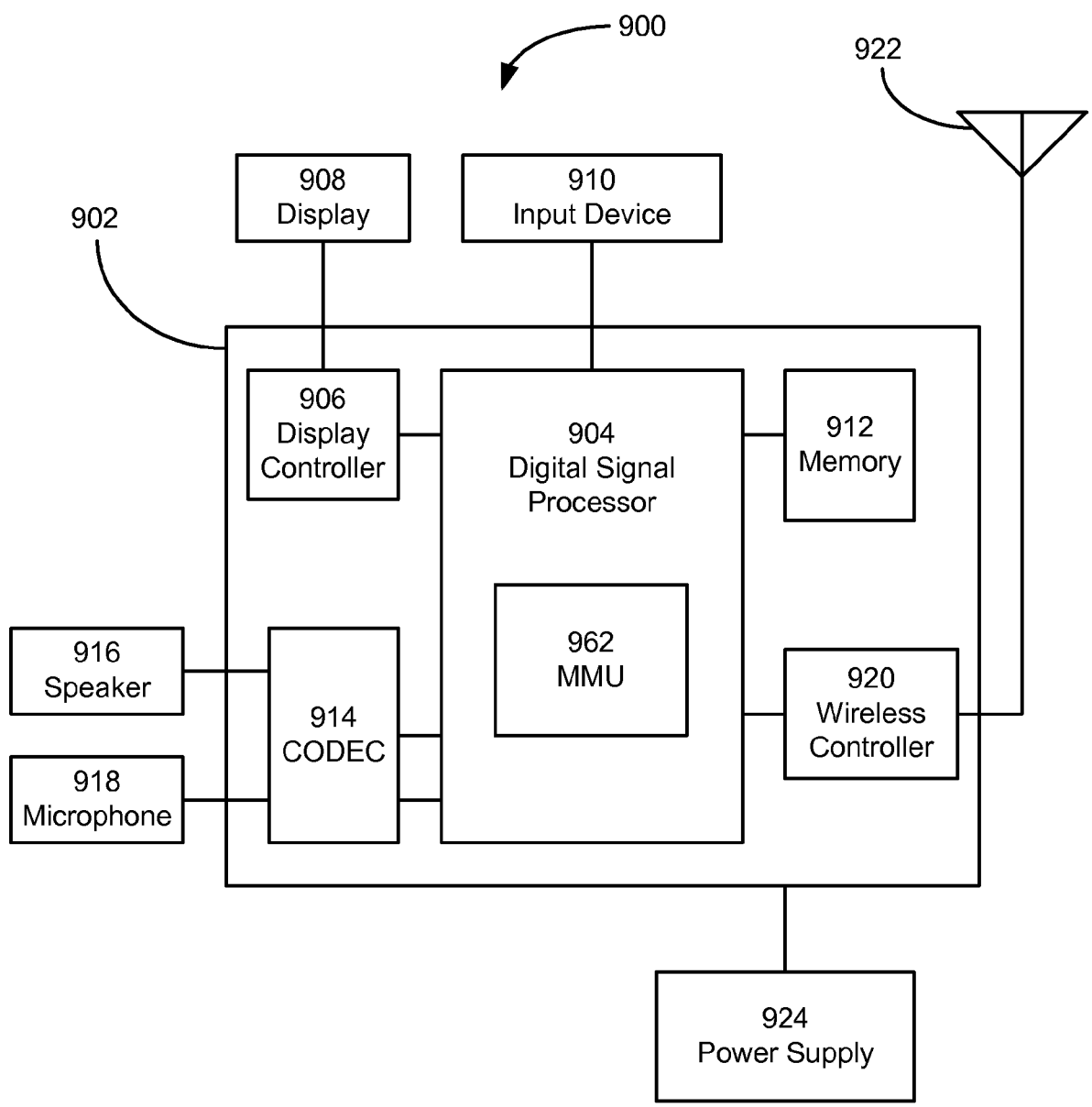
FIG. 9 is a diagram illustrating an example portable communication device that may include an authentication system according to certain embodiments.

FIG. 9 is a diagram illustrating an exemplary embodiment of a portable communication device 900. As illustrated in the general diagram of FIG. 9, the portable communication device includes an on-chip system 902 that includes a digital signal processor (DSP) 904. The general diagram of FIG. 9 also shows a display controller 906 that is coupled to the digital signal processor (DSP) 904 and a display 908. Moreover, an input device 910 is coupled to the DSP 904. As shown, a memory 912 is coupled to the DSP 904. Additionally, a coder/decoder (CODEC) 914 may be coupled to the DSP 904. A speaker 916 and a microphone 918 may be coupled to the CODEC 914.

The general diagram of FIG. 9 further illustrates a wireless controller 920 coupled to the digital signal processor 904 and a wireless antenna 922. In a particular embodiment, a power supply 924 is coupled to the on-chip system 902. The display 908, the input device 910, the speaker 916, the microphone 918, the wireless antenna 922, and the power supply 924 may be external to the on-chip system 902. However, each can be coupled to a component of the on-chip system 902.

In a particular embodiment, the digital signal processor 904 includes an MMU 962, such as is described with reference to FIGS. 1-8, that can manage authentication of secure code to protect against attacks designed to replace authenticated secure code with non-authenticated unsecure code.

Figure 10:
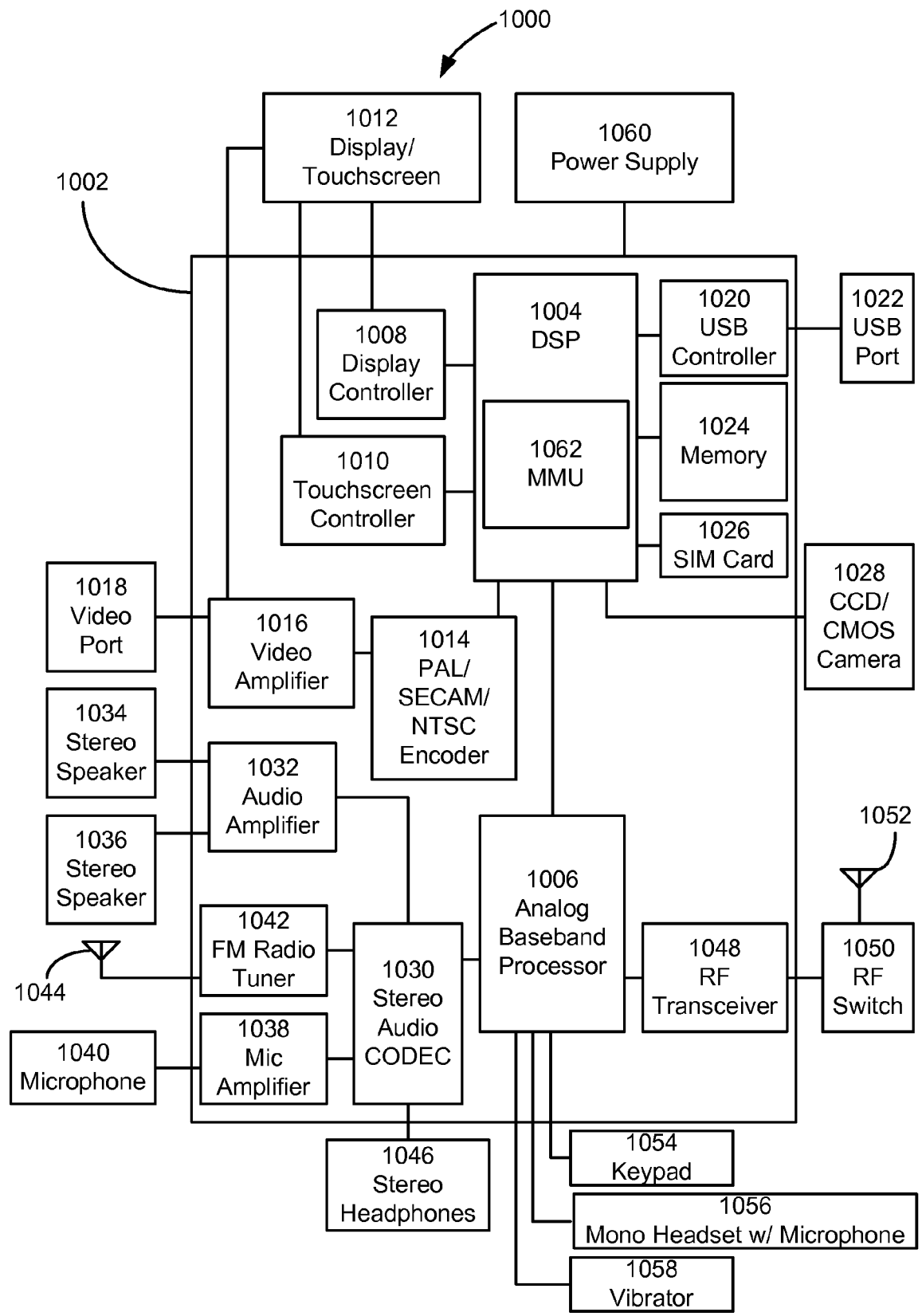
FIG. 10 is a diagram illustrating an example cellular telephone that may include an authentication system according to certain embodiments.

FIG. 10 is a diagram illustrating an exemplary embodiment of a cellular telephone 1000. As shown, the cellular telephone 1000 includes an on-chip system 1002 that includes a digital baseband processor 804 and an analog baseband processor 1006 that are coupled together. In a particular embodiment, the digital baseband processor 1004 is a digital signal processor. As illustrated in the general diagram of FIG. 10, a display controller 1008 and a touchscreen controller 1010 are coupled to the digital baseband processor 1004. In turn, a touchscreen display 1012 external to the on-chip system 1002 is coupled to the display controller 1008 and the touchscreen controller 1010.

The general diagram of FIG. 10 further illustrates a video encoder 1014, e.g., a phase alternating line (PAL) encoder, a sequential couleur a memoire (SECAM) encoder, or a national television system(s) committee (NTSC) encoder, is coupled to the digital baseband processor 1004. Further, a video amplifier 816 is coupled to the video encoder 1014 and the touchscreen display 1012. Also, a video port 1018 is coupled to the video amplifier 1016. A universal serial bus (USB) controller 1020 is coupled to the digital baseband processor 1004. Also, a USB port 1022 is coupled to the USB controller 820. A memory 1024 and a subscriber identity module (SIM) card 1026 may also be coupled to the digital baseband processor 1004. Further, as shown in the general diagram of FIG. 10, a digital camera 1028 may be coupled to the digital baseband processor 1004. In an exemplary embodiment, the digital camera 1028 is a charge-coupled device (CCD) camera or a complementary metal-oxide semiconductor (CMOS) camera.

As further illustrated in the general diagram of FIG. 10, a stereo audio CODEC 1030 may be coupled to the analog baseband processor 1006. Moreover, an audio amplifier 1032 may be coupled to the stereo audio CODEC 1030. In an exemplary embodiment, a first stereo speaker 1034 and a second stereo speaker 1036 are coupled to the audio amplifier 1032. A microphone amplifier 1038 may be also coupled to the stereo audio CODEC 1030. Additionally, a microphone 1040 may be coupled to the microphone amplifier 1038. In a particular embodiment, a frequency modulation (FM) radio tuner 1042 may be coupled to the stereo audio CODEC 1030. An FM antenna 1044 can be coupled to the FM radio tuner 1042. Further, stereo headphones 846 may be coupled to the stereo audio CODEC 1030.

The general diagram of FIG. 10 further illustrates a radio frequency (RF) transceiver 1048 that may be coupled to the analog baseband processor 1006. An RF switch 1050 may be coupled to the RF transceiver 1048 and an RF antenna 1052. A keypad 1054 may be coupled to the analog baseband processor 1006. Also, a mono headset with a microphone 1056 may be coupled to the analog baseband processor 1006. Further, a vibrator device 1058 may be coupled to the analog baseband processor 1006. The general diagram of FIG. 10 also shows a power supply 1060 that may be coupled to the on-chip system 1002. In a particular embodiment, the power supply 1060 is a direct current (DC) power supply that provides power to the various components of the cellular telephone 1000. Further, in a particular embodiment, the power supply is a rechargeable DC battery or a DC power supply that is derived from an alternating current (AC) to DC transformer that is coupled to an AC power source.

As depicted in the general diagram of FIG. 10, the touchscreen display 1012, the video port 1018, the USB port 1022, the camera 1028, the first stereo speaker 1034, the second stereo speaker 1036, the microphone 1040, the FM antenna 1044, the stereo headphones 1046, the RF switch 1050, the RF antenna 1052, the keypad 1054, the mono headset 1056, the vibrator 1058, and the power supply 1060 may be external to the on-chip system 1002.

In a particular embodiment, the digital baseband processor 1004 includes an MMU 1062, such as is described with reference to FIGS. 1-8, that can manage authentication of secure code to protect against attacks designed to replace authenticated secure code with non-authenticated unsecure code.

Figure 11:
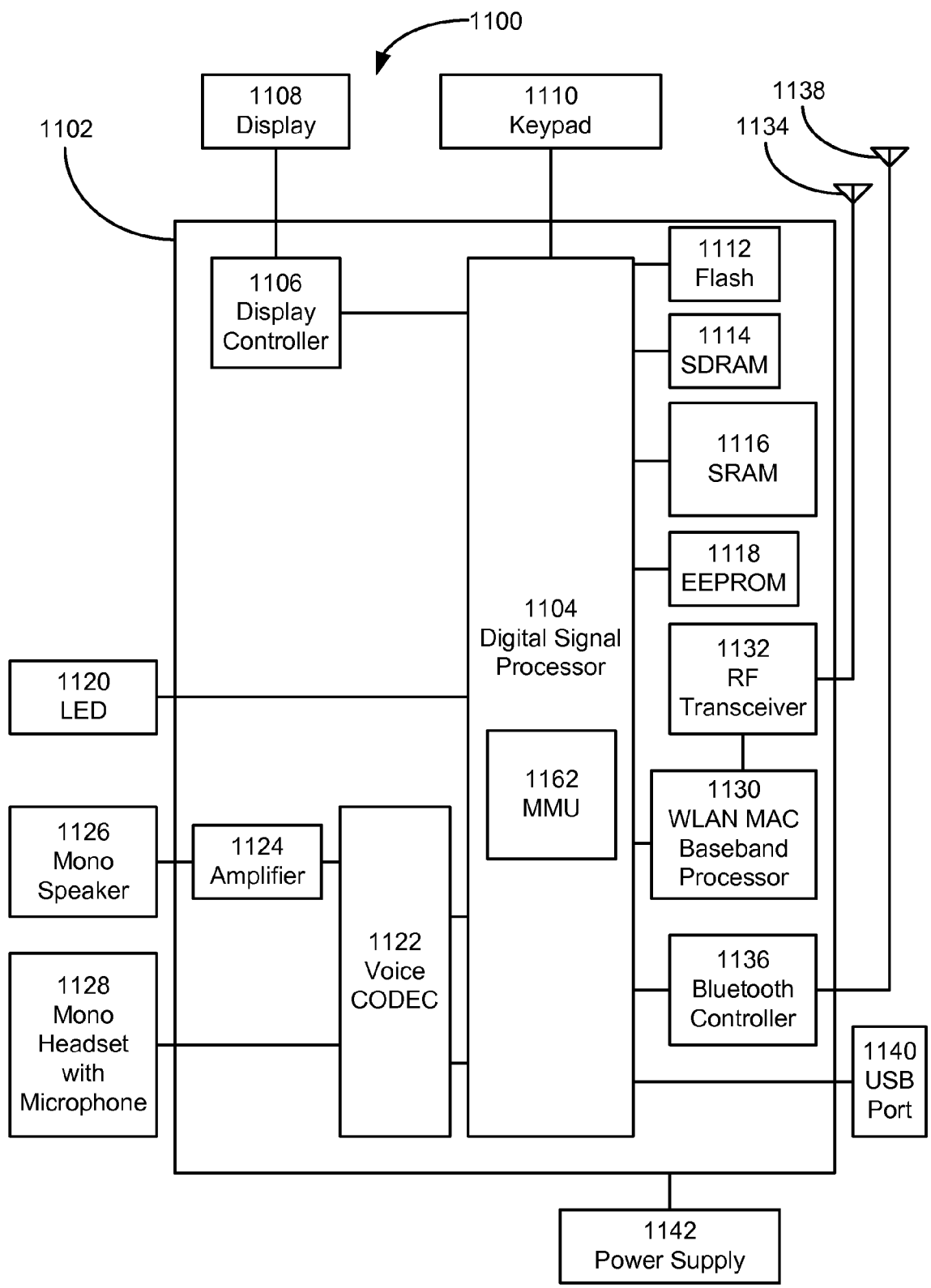
FIG. 11 is a diagram illustrating an example wireless Internet Protocol telephone that may include an authentication system according to certain embodiments.

FIG. 11 is a diagram illustrating an exemplary embodiment of a wireless Internet protocol (IP) telephone 1100. As shown, the wireless IP telephone 1100 includes an on-chip system 1102 that includes a digital signal processor (DSP) 1104. A display controller 1106 may be coupled to the DSP 1104 and a display 1108 is coupled to the display controller 1106. In an exemplary embodiment, the display 1108 is a liquid crystal display (LCD). FIG. 11 further shows that a keypad 1110 may be coupled to the DSP 1104.

A flash memory 1112 may be coupled to the DSP 1104. A synchronous dynamic random access memory (SDRAM) 1114, a static random access memory (SRAM) 1116, and an electrically erasable programmable read only memory (EEPROM) 1118 may also be coupled to the DSP 1104. The general diagram of FIG. 11 also shows that a light emitting diode (LED) 1120 may be coupled to the DSP 1104. Additionally, in a particular embodiment, a voice CODEC 1122 may be coupled to the DSP 1104. An amplifier 1124 may be coupled to the voice CODEC 1122 and a mono speaker 1126 may be coupled to the amplifier 1124. The general diagram of FIG. 11 further illustrates a mono headset 1128 coupled to the voice CODEC 1122. In a particular embodiment, the mono headset 1128 includes a microphone.

A wireless local area network (WLAN) baseband processor 1130 may be coupled to the DSP 1104. An RF transceiver 1132 may be coupled to the WLAN baseband processor 1130 and an RF antenna 1134 may be coupled to the RF transceiver 1132. In a particular embodiment, a Bluetooth controller 1136 may also be coupled to the DSP 1104 and a Bluetooth antenna 1138 may be coupled to the controller 1136. The general diagram of FIG. 11 also shows that a USB port 1140 may also be coupled to the DSP 1104. Moreover, a power supply 1142 is coupled to the on-chip system 1102 and provides power to the various components of the wireless IP telephone 1100.

As indicated in the general diagram of FIG. 11, the display 1108, the keypad 1110, the LED 1120, the mono speaker 1126, the mono headset 1128, the RF antenna 1134, the Bluetooth antenna 1138, the USB port 1140, and the power supply 1142 may be external to the on-chip system 1102 and coupled to one or more components of the on-chip system 1102.

In a particular embodiment, the DSP 1104 includes an MMU 1162, such as is described with reference to FIGS. 1-8, that can manage authentication of secure code to protect against attacks designed to replace authenticated secure code with non-authenticated unsecure code.

Figure 12:
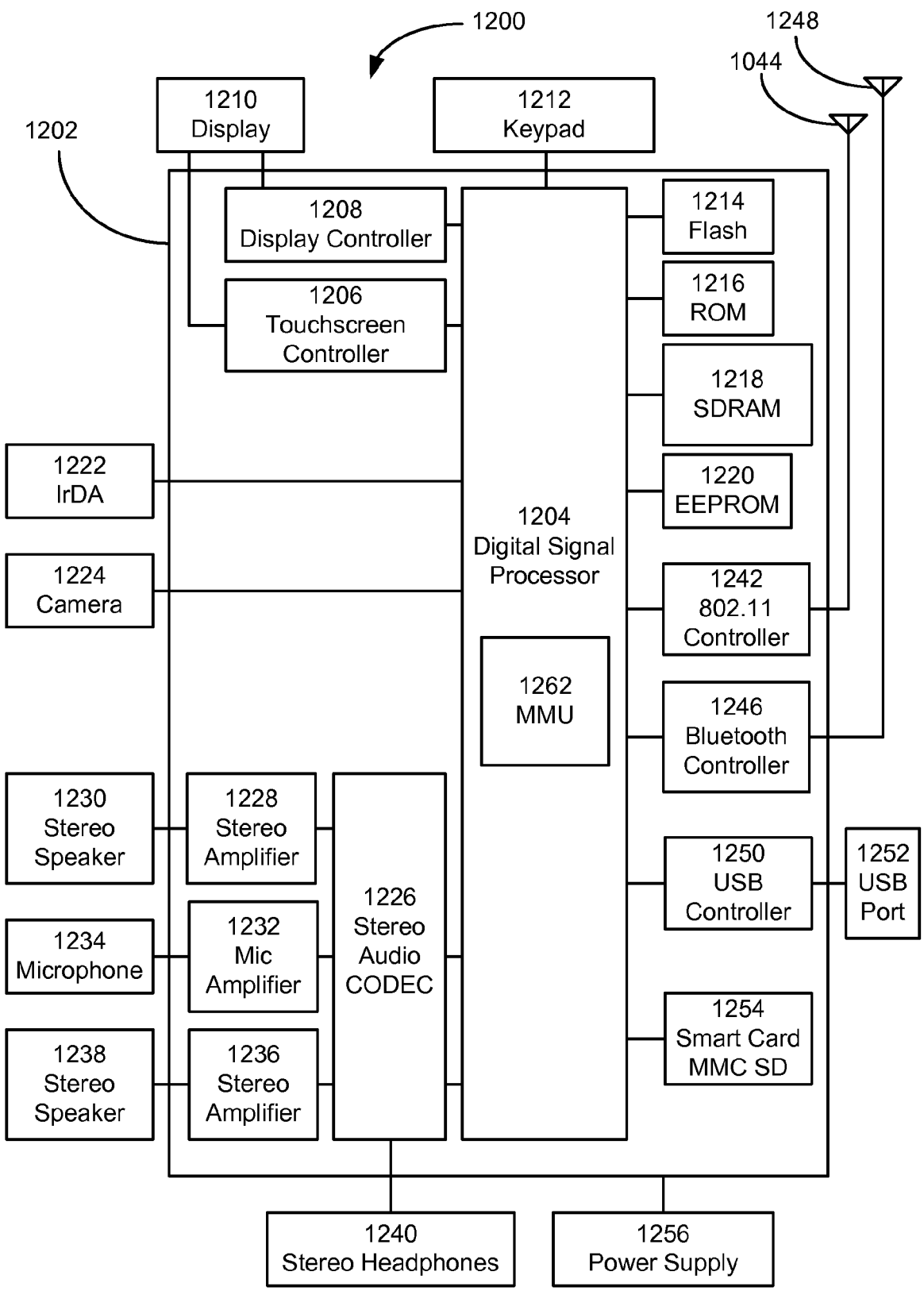
FIG. 12 is a diagram illustrating an embodiment of a portable digital assistant that may include an illustrative authentication system according to certain embodiments.

FIG. 12 is a diagram illustrating an exemplary embodiment of a portable digital assistant (PDA) 1200. As shown, the PDA 1200 includes an on-chip system 1202 that includes a digital signal processor (DSP) 1204. A flash memory 1214 may be coupled to the DSP 1204. A read only memory (ROM) 1216, a synchronous dynamic random access memory (SDRAM) 1218, and an electrically erasable programmable read only memory (EEPROM) 1220 may also be coupled to the DSP 1204. A touchscreen controller 1206 and a display controller 1208 are coupled to the DSP 1204. Further, a touchscreen display 1210 is coupled to the touchscreen controller 1206 and to the display controller 1208. The general diagram of FIG. 12 also indicates that a keypad 1212 may be coupled to the DSP 1204.

In a particular embodiment, a stereo audio CODEC 1226 may be coupled to the DSP 1204. A first stereo amplifier 1228 may be coupled to the stereo audio CODEC 1226 and a first stereo speaker 1230 may be coupled to the first stereo amplifier 1228. Additionally, a microphone amplifier 1032 may be coupled to the stereo audio CODEC 1226 and a microphone 1234 may be coupled to the microphone amplifier 1232. The general diagram of FIG. 12 further shows a second stereo amplifier 1236 that may be coupled to the stereo audio CODEC 1226 and a second stereo speaker 1238 that may be coupled to the second stereo amplifier 1236. In a particular embodiment, stereo headphones 1240 may also be coupled to the stereo audio CODEC 1226.

The general diagram of FIG. 12 also illustrates an 802.11 controller 1242 that may be coupled to the DSP 1204 and an 802.11 antenna 1244 that may be coupled to the 802.11 controller 1242. Moreover, a Bluetooth controller 1246 may be coupled to the DSP 1204 and a Bluetooth antenna 1248 may be coupled to the Bluetooth controller 1246. A USB controller 1250 may be coupled to the DSP 1204 and a USB port 1252 may be coupled to the USB controller 1250. Additionally, a smart card 1254, e.g., a multimedia card (MMC) or a secure digital card (SD), may be coupled to the DSP 1204. Further, a power supply 1256 may be coupled to the on-chip system 1202 and may provide power to the various components of the PDA 1200.

As indicated in the general diagram of FIG. 12, the display 1210, the keypad 1012, the IrDA port 1222, the digital camera 1224, the first stereo speaker 1230, the microphone 1234, the second stereo speaker 1238, the stereo headphones 1240, the 802.11 antenna 1244, the Bluetooth antenna 1248, the USB port 1252, and the power supply 1256 may be external to the on-chip system 1202 and coupled to one or more components on the on-chip system 1202.

In a particular embodiment, the DSP 1204 includes an MMU 1262, such as is described with reference to FIGS. 1-8, that can manage authentication of secure code to protect against attacks designed to replace authenticated secure code with non-authenticated unsecure code.

Figure 13:
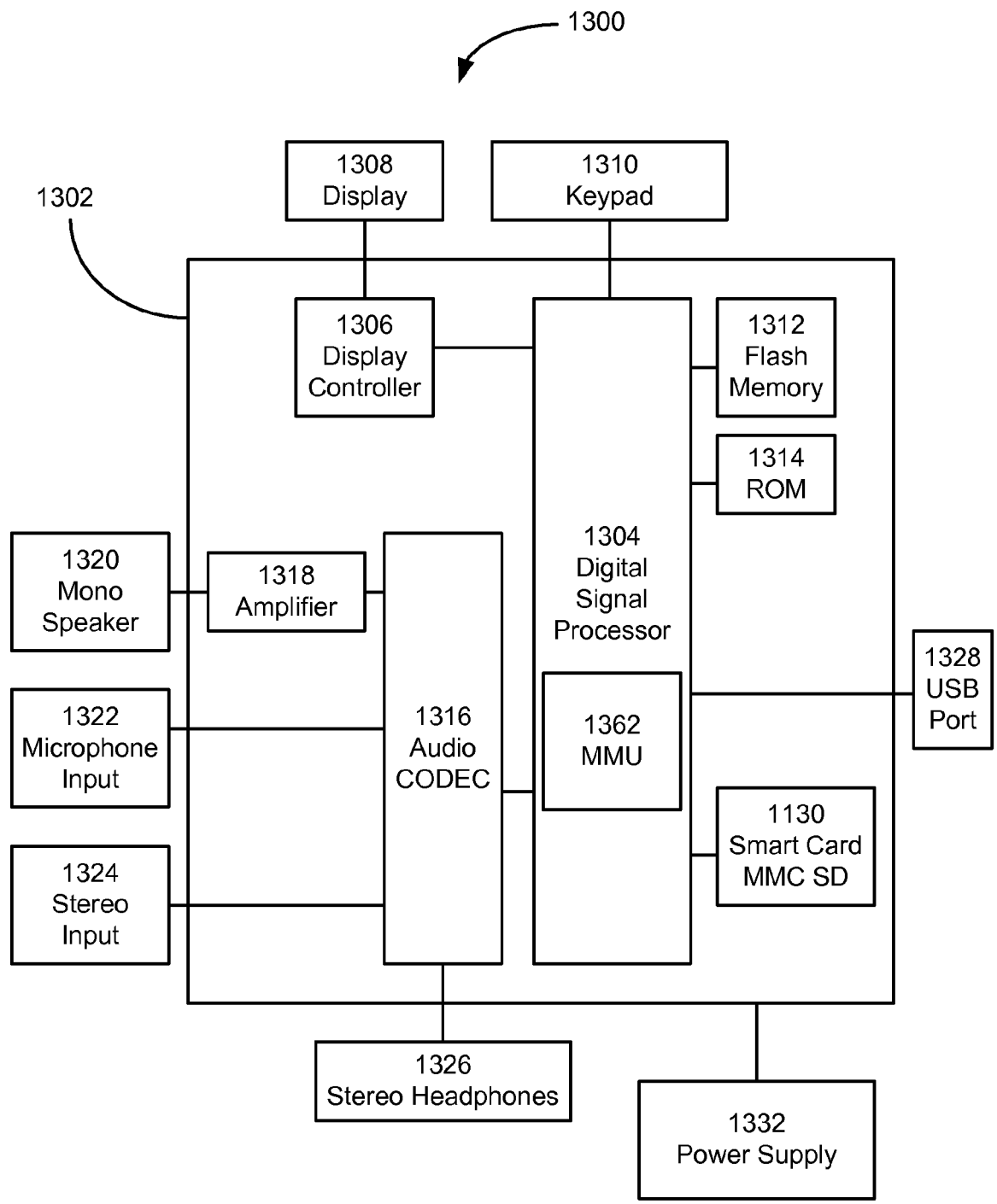
FIG. 13 is a diagram illustrating an example audio file player that may include an authentication system according to certain embodiments.

FIG. 13 is a diagram illustrating an exemplary embodiment of an audio file player (e.g., MP3 player) 1300. As shown, the audio file player 1300 includes an on-chip system 1302 that includes a digital signal processor (DSP) 1304. A display controller 1306 may be coupled to the DSP 1304 and a display 1308 is coupled to the display controller 1306. In an exemplary embodiment, the display 1308 is a liquid crystal display (LCD). A keypad 1310 may be coupled to the DSP 1304.

As further depicted in the general diagram of FIG. 13, a flash memory 1312 and a read only memory (ROM) 1314 may be coupled to the DSP 1304. Additionally, in a particular embodiment, an audio CODEC 1316 may be coupled to the DSP 1304. An amplifier 1318 may be coupled to the audio CODEC 1316 and a mono speaker 1320 may be coupled to the amplifier 1318. The general diagram of FIG. 13 further indicates that a microphone input 1322 and a stereo input 1324 may also be coupled to the audio CODEC 1316. In a particular embodiment, stereo headphones 1326 may also be coupled to the audio CODEC 1316.

A USB port 1328 and a smart card 1330 may be coupled to the DSP 1304. Additionally, a power supply 1332 may be coupled to the on-chip system 1302 and may provide power to the various components of the audio file player 1300.

As indicated in the general diagram of FIG. 13 the display 1308, the keypad 1310, the mono speaker 1320, the microphone input 1322, the stereo input 1324, the stereo headphones 1326, the USB port 1328, and the power supply 1332 are external to the on-chip system 1302 and coupled to one or more components on the on-chip system 1302.

In a particular embodiment, the DSP 1304 includes an MMU 1362, such as is described with reference to FIGS. 1-8, that can manage authentication of secure code to protect against attacks designed to replace authenticated secure code with non-authenticated unsecure code.

General

A computing device may access one or more computer-readable media that tangibly embody computer-readable instructions which, when executed by at least one computer, cause the at least one computer to implement one or more embodiments of the present disclosure. When software is utilized, the software may comprise one or more components, processes, and/or applications. Additionally or alternatively to software, the computing device(s) may comprise circuitry that renders the device(s) operative to implement one or more of the methods of the present disclosure.

Embodiments of the present disclosure may comprise systems having different architecture and methods having different information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

We claim:

1. A system comprising:
   a processor configured to run secure or non-secure instruction code;
   a memory configured to store a page table having execute permissions for memory pages from which instructions for the processor may be fetched and executed, wherein the execute permissions are settable between indicating allowing execution and indicating not allowing execution;
   a translation lookaside buffer configured to maintain, for each of a plurality of the memory pages, a valid entry corresponding to the memory page, the valid entry including the execute permissions for the memory page;
   a memory management unit configured to:
   set the execute permissions of entries in the translation lookaside buffer in accordance with the processor,
   wherein the memory management unit is configured to perform a lookup of the translation lookaside buffer, of a given address, to determine whether the translation lookaside buffer has, among said valid entries, a valid entry corresponding to the memory page,
   wherein the processor is configured to perform, in response to the translation lookaside buffer indicating having the valid entry corresponding to said memory page and that the execute permissions included in the valid entry are set as the execute permissions allowing execution, a fetch and execute of an instruction corresponding to the given address, else to perform an interrupt service routine comprising:
      a lookup of the page table to determine if the execute permissions for said memory page are set as indicating allowing execution,
      in response to the lookup of the page table determining the execute permissions for said memory page are set as indicating not allowing execution, to invoke an error handling procedure and terminate the interrupt service routine, else to determine whether said memory page is authentic,
      in response to determining said memory page is not authentic, to invoke the error handling procedure and terminate the interrupt service routine, else to cause the memory management unit to set another valid entry in the translation lookaside buffer, corresponding to said memory page;

and wherein the processor is configured to perform, in response to performing the interrupt service routine without invoking the error handling procedure, a fetch and execute of the instruction corresponding to the given address.

2. The system of claim 1 wherein the memory is further configured to have a list of recently authenticated pages, wherein the processor is configured to include, in said determining whether said memory page is authentic a search of said list, and if said search identifies said memory page on the list, to identify said memory page as authentic.

3. The system of claim 1 further comprising
a timer that expires; and
logic to prevent execution of an instruction from a memory page unless the memory page is known to have been authenticated since a last expiration of the timer.

4. The system of claim 3 wherein the timer and the processor are part of an integrated circuit.

5. The system of claim 1 wherein the system is disposed within a portable device.

6. A method comprising:
maintaining a translation lookaside buffer with execute permission entries;
determining if an instruction in a memory page has a valid execute permission entry in the translation lookaside buffer;
if the instruction does not have a valid execute permission entry in the translation lookaside buffer, then
determining if execution of the instruction is permitted, and
if execution of the instruction is determined as permitted, then determining if authentication of the page is needed and, if authentication is determined as needed, authenticating the page; and
setting the execute permission entry for the instruction in the translation lookaside buffer to indicate that the execute permission entry is valid and execution of the instruction is permitted.

7. The method of claim 6 wherein authenticating the page comprises:
determining if the page is on a list of recently authenticated pages;
if the page is not on the list of recently authenticated pages, then authenticating the page; and
adding the page to the list of recently authenticated pages.

8. The method of claim 7, further comprising:
if the instruction in the memory page is determined to have a valid execute permission entry in the translation lookaside buffer, then determining if the execute permission entry in the translation lookaside buffer permits execution of the instruction;
if the execute permission entry in the translation lookaside buffer does not permit execution of the instruction, then determining if the page is on the list of recently authenticated pages;
if the page is not on the list of recently authenticated pages, then determining if execution of the instruction is permitted;
if execution of the instruction is permitted, then
determining if the page requires authentication;
if the page requires authentication, then
authenticating the page; and
adding the page to the list of recently authenticated pages;
setting the execute permission entry for the instruction in the translation lookaside buffer to indicate that the execute permission entry is valid and execution of the instruction is permitted.

9. The method of claim 8 further comprising:
setting a timer;
upon expiration of the timer, setting an execute permission entry in the translation lookaside buffer to disallow execution of an instruction associated with the execute permission entry; and
resetting the timer.

10. The method of claim 9 wherein the execute permission entry in the translation lookaside buffer is for an instruction in a page residing in off-chip memory.

11. The method of claim 9 further comprising removing entries in a list of recently authenticated pages upon expiration of the timer.

12. The method of claim 9 wherein setting an execute permission entry in the translation lookaside buffer to disallow execution of an instruction associated with the execute permission entry comprises:
searching a list of recently authenticated pages;
setting the execute permission entry in the translation lookaside buffer to disallow execution of the instruction only if the instruction is in a page on the list of recently authenticated pages.

13. A computer program product comprising:
non-transitory computer-readable medium comprising:
code for determining if execution of an instruction not having a valid execute permission entry in a translation lookaside buffer is permitted;
code for determining if authentication of a memory page containing the instruction is required;
code for authenticating the memory page containing the instruction whose execution is permitted;
code for updating the execute permission entry in the translation lookaside buffer for the instruction whose execution is permitted; and
code for setting the execute permission entry in the translation lookaside buffer to disallow execution of the instruction upon expiration of a timer.

14. The computer program product of claim 13 wherein the non-transitory computer-readable medium further comprises code for maintaining a list of recently authenticated pages in memory.

15. A computer program product, comprising non-transitory computer-readable medium comprising:
code for determining if execution of an instruction not having a valid execute permission entry in a translation lookaside buffer is permitted;
code for determining if authentication of a memory page containing the instruction is required;
code for authenticating the memory page containing the instruction whose execution is permitted;
code for updating the execute permission entry in the translation lookaside buffer for the instruction whose execution is permitted;
code for maintaining a list of recently authenticated pages in memory; and
code for removing one or more entries in the list of recently authenticated pages upon expiration of a timer.

16. The computer program product of claim 13 wherein the non-transitory computer-readable medium further comprises code for modifying an execute permission entry in the translation lookaside buffer only if the instruction associated with the execute permission entry is in a page on a list of recently authenticated pages.

17. A system comprising:
a memory storing memory pages from which instructions for a processor may be fetched and executed;
a processor configured to run secure or non-secure instruction code, and configured to authenticate the memory pages;
memory management unit configured to maintain a list of recently authenticated memory pages, and to cache attributes of the memory pages, including execute permissions for instructions from the memory pages, and to set the execute permissions based at least on the processor authenticating the memory pages;
a timer that expires; and
logic to prevent execution of the instruction from the memory page unless the memory page is indicated by said list to have been authenticated since a last expiration of the timer.

18. The system of claim 17 wherein the memory management unit further comprises a translation lookaside buffer comprising the execute permissions.

19. A method comprising:
determining if execution of an instruction not having a valid execute permission entry in a translation lookaside buffer is permitted;
determining if authentication of a memory page containing the instruction is required;
authenticating the memory page containing the instruction whose execution is permitted;
updating the execute permission entry in the translation lookaside buffer for the instruction whose execution is permitted; and
setting the execute permission entry in the translation lookaside buffer to disallow execution of the instruction upon expiration of a timer.

20. A method comprising:
determining if execution of an instruction not having a valid execute permission entry in a translation lookaside buffer is permitted;
determining if authentication of a memory page containing the instruction is required;
authenticating the memory page containing the instruction whose execution is permitted;
updating the execute permission entry in the translation lookaside buffer for the instruction whose execution is permitted;
maintaining a list of recently authenticated pages in memory; and
removing one or more entries in the list of recently authenticated pages upon expiration of a timer.

21. An apparatus comprising:
means for determining if execution of an instruction not having a valid execute permission entry in a translation lookaside buffer is permitted;
means for determining if authentication of a memory page containing the instruction is required;
means for authenticating the memory page containing the instruction whose execution is permitted;
means for updating the execute permission entry in the translation lookaside buffer for the instruction whose execution is permitted; and
means for setting the execute permission entry in the translation lookaside buffer to disallow execution of the instruction upon expiration of a timer.

22. An apparatus, comprising:
means for determining if execution of an instruction not having a valid execute permission entry in a translation lookaside buffer is permitted;
means for determining if authentication of a memory page containing the instruction is required;
means for authenticating the memory page containing the instruction whose execution is permitted;
means for updating the execute permission entry in the translation lookaside buffer for the instruction whose execution is permitted;
means for maintaining a list of recently authenticated pages in memory; and
means for removing one or more entries in the list of recently authenticated pages upon expiration of a timer.

* * * * *